(12) United States Patent
Liu et al.

(10) Patent No.: US 8,450,930 B2
(45) Date of Patent: May 28, 2013

(54) SHEET-SHAPED HEAT AND LIGHT SOURCE

(75) Inventors: Chang-Hong Liu, Bei-Jing (CN); Shou-Shan Fan, Bei-Jing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 396 days.

(21) Appl. No.: 12/006,301

(22) Filed: Dec. 29, 2007

(65) Prior Publication Data

US 2009/0096346 A1    Apr. 16, 2009

(30) Foreign Application Priority Data

Oct. 10, 2007   (CN) .......................... 2007 1 0123809

(51) Int. Cl.
*H05B 3/14*    (2006.01)
*H05B 3/20*    (2006.01)
*H01K 1/06*    (2006.01)

(52) U.S. Cl.
USPC ........................... 313/578; 313/498; 313/315

(58) Field of Classification Search
USPC .......................... 313/311, 310, 491, 578, 498
See application file for complete search history.

(56) References Cited

U.S. PATENT DOCUMENTS

| | | | |
|---|---|---|---|
| 1,710,512 A | 4/1929 | Pitt | |
| 3,304,459 A | 2/1967 | Shaw et al. | |
| 4,563,572 A | 1/1986 | Hager, Jr. | |
| 5,756,215 A | 5/1998 | Sawamura et al. | |
| 5,949,180 A * | 9/1999 | Walker | 313/113 |
| 5,998,049 A | 12/1999 | Tanaka et al. | |
| 6,031,970 A | 2/2000 | Nordal et al. | |
| 6,037,574 A | 3/2000 | Lanham et al. | |
| 6,043,468 A | 3/2000 | Toya et al. | |
| 6,183,714 B1 | 2/2001 | Smalley et al. | |
| 6,188,839 B1 | 2/2001 | Pennella | |
| 6,232,706 B1 | 5/2001 | Dai et al. | |
| 6,294,758 B1 | 9/2001 | Masao et al. | |
| 6,369,361 B2 | 4/2002 | Saito et al. | |
| 6,407,371 B1 | 6/2002 | Toya et al. | |
| 6,422,450 B1 * | 7/2002 | Zhou et al. | 219/121.85 |
| 6,501,056 B1 | 12/2002 | Hirohata et al. | |

(Continued)

FOREIGN PATENT DOCUMENTS

| | | |
|---|---|---|
| CN | 1044023 | 7/1990 |
| CN | 2324745 | 6/1999 |

(Continued)

OTHER PUBLICATIONS

Mei Zhang,et al. Strong, Transparent, Mutifunctional,Carbon Nanotube Sheets. Science, Aug. 19, 2005,1215-1219,309,The American Association for the Advancement of Science, USA.

(Continued)

*Primary Examiner* — Sikha Roy
(74) *Attorney, Agent, or Firm* — Altis Law Group, Inc.

(57) ABSTRACT

The present invention relates to a sheet-shaped heat and light source. The sheet-shaped heat and light source includes a carbon nanotube film and at least two electrodes. The at least two electrodes are separately disposed on the carbon nanotube film and electrically connected thereto. The carbon nanotube film includes a plurality of carbon nanotubes arranging isotropically, along a fixed direction, or along different directions. Moreover, a method for making the sheet-shaped heat and light source and a method for heating an object adopting the same are also included.

20 Claims, 7 Drawing Sheets

U.S. PATENT DOCUMENTS

| | | |
|---|---|---|
| 6,541,744 B2 | 4/2003 | Von Arx et al. |
| 6,712,864 B2 | 3/2004 | Horiuchi et al. |
| 6,790,425 B1 | 9/2004 | Smalley et al. |
| 6,809,298 B2 | 10/2004 | Baba et al. |
| 6,872,924 B2 | 3/2005 | Eckert |
| 6,891,263 B2 | 5/2005 | Hiramatsu et al. |
| 6,929,874 B2 | 8/2005 | Hiramatsu et al. |
| 6,949,877 B2 * | 9/2005 | Sun et al. .................. 313/491 |
| 6,957,993 B2 | 10/2005 | Jiang et al. |
| 6,961,516 B2 | 11/2005 | Toya et al. |
| 7,003,253 B2 | 2/2006 | Uchida et al. |
| 7,008,563 B2 | 3/2006 | Smalley et al. |
| 7,045,108 B2 | 5/2006 | Jiang et al. |
| 7,049,735 B2 * | 5/2006 | Ohkubo et al. ............ 313/341 |
| 7,054,064 B2 | 5/2006 | Jiang et al. |
| 7,060,241 B2 * | 6/2006 | Glatkowski ............ 423/447.1 |
| 7,072,578 B2 | 7/2006 | Saito et al. |
| 7,081,030 B2 | 7/2006 | Liu et al. |
| 7,097,820 B2 | 8/2006 | Colbert et al. |
| 7,105,596 B2 | 9/2006 | Smalley et al. |
| 7,115,013 B2 | 10/2006 | Liu et al. |
| 7,147,831 B2 | 12/2006 | Liu et al. |
| 7,177,579 B2 | 2/2007 | Uchida et al. |
| 7,321,188 B2 | 1/2008 | Jiang et al. |
| 7,357,691 B2 | 4/2008 | Liu et al. |
| 7,615,205 B2 | 11/2009 | Jiang et al. |
| 7,638,933 B2 | 12/2009 | Jiang et al. |
| 7,642,489 B2 | 1/2010 | Liu et al. |
| 7,662,467 B2 | 2/2010 | Li et al. |
| 7,704,480 B2 | 4/2010 | Jiang et al. |
| 7,741,765 B2 | 6/2010 | Liu et al. |
| 7,744,793 B2 | 6/2010 | Lemaire et al. |
| 7,780,496 B2 | 8/2010 | Liu et al. |
| 7,785,907 B2 | 8/2010 | Zheng et al. |
| 7,826,199 B2 | 11/2010 | Liu et al. |
| 7,850,778 B2 | 12/2010 | Lemaire |
| 7,854,992 B2 * | 12/2010 | Fu et al. .................. 428/408 |
| 7,947,145 B2 * | 5/2011 | Wang et al. ............... 156/281 |
| 7,947,542 B2 | 5/2011 | Liu et al. |
| 7,947,977 B2 | 5/2011 | Jiang et al. |
| 2002/0040900 A1 | 4/2002 | Arx et al. |
| 2002/0122765 A1 | 9/2002 | Horiuchi et al. |
| 2002/0150524 A1 | 10/2002 | Smalley et al. |
| 2002/0162835 A1 | 11/2002 | Toya et al. |
| 2003/0052585 A1 | 3/2003 | Guillorn et al. |
| 2003/0133865 A1 | 7/2003 | Smalley et al. |
| 2003/0143398 A1 | 7/2003 | Ohki et al. |
| 2003/0164477 A1 | 9/2003 | Zhou et al. |
| 2003/0186625 A1 | 10/2003 | Nakayama et al. |
| 2003/0203225 A1 | 10/2003 | Hiramatsu et al. |
| 2003/0217933 A1 | 11/2003 | Miyagi et al. |
| 2004/0051432 A1 * | 3/2004 | Jiang et al. ............... 313/311 |
| 2004/0053053 A1 * | 3/2004 | Jiang et al. ............... 428/408 |
| 2004/0099657 A1 | 5/2004 | Park |
| 2004/0101468 A1 * | 5/2004 | Liu et al. ............... 423/447.3 |
| 2004/0109815 A1 | 6/2004 | Liu et al. |
| 2004/0136893 A1 | 7/2004 | Horiuchi et al. |
| 2004/0185320 A1 | 9/2004 | Inagaki et al. |
| 2004/0191158 A1 | 9/2004 | Liu et al. |
| 2004/0195957 A1 * | 10/2004 | Hu et al. .................. 313/495 |
| 2004/0197599 A1 | 10/2004 | Higuchi et al. |
| 2004/0209385 A1 | 10/2004 | Liu et al. |
| 2005/0081983 A1 | 4/2005 | Nakayama et al. |
| 2005/0224764 A1 | 10/2005 | Ma et al. |
| 2005/0236951 A1 | 10/2005 | Liu et al. |
| 2005/0264155 A1 | 12/2005 | Liu et al. |
| 2005/0266766 A1 | 12/2005 | Wei et al. |
| 2006/0035084 A1 | 2/2006 | Liu et al. |
| 2006/0055074 A1 | 3/2006 | Huang et al. |
| 2006/0118768 A1 | 6/2006 | Liu et al. |
| 2006/0135677 A1 | 6/2006 | Huang et al. |
| 2006/0208354 A1 | 9/2006 | Liu et al. |
| 2006/0225163 A1 | 10/2006 | Wei et al. |
| 2006/0231970 A1 | 10/2006 | Huang et al. |
| 2006/0233575 A1 | 10/2006 | Uchida et al. |
| 2006/0234056 A1 | 10/2006 | Huang et al. |
| 2006/0239898 A1 | 10/2006 | Jiang et al. |
| 2006/0263274 A1 | 11/2006 | Jiang et al. |
| 2006/0263524 A1 | 11/2006 | Jiang et al. |
| 2006/0269668 A1 | 11/2006 | Jiang et al. |
| 2006/0269669 A1 | 11/2006 | Jiang et al. |
| 2006/0272061 A1 | 11/2006 | Wei et al. |
| 2007/0003718 A1 | 1/2007 | Nakashima et al. |
| 2007/0116631 A1 | 5/2007 | Li et al. |
| 2007/0166223 A1 * | 7/2007 | Jiang et al. ............... 423/447.1 |
| 2007/0237959 A1 * | 10/2007 | Lemaire .................. 428/408 |
| 2007/0243124 A1 * | 10/2007 | Baughman et al. ........ 423/447.1 |
| 2007/0292614 A1 | 12/2007 | Liu et al. |
| 2007/0296322 A1 | 12/2007 | Liu et al. |
| 2007/0298253 A1 | 12/2007 | Hata et al. |
| 2008/0009434 A1 | 1/2008 | Reches et al. |
| 2008/0018012 A1 | 1/2008 | Lemaire et al. |
| 2008/0063860 A1 | 3/2008 | Song et al. |
| 2008/0122335 A1 | 5/2008 | Liu et al. |
| 2008/0170982 A1 | 7/2008 | Zhang et al. |
| 2008/0248235 A1 | 10/2008 | Feng et al. |
| 2008/0292835 A1 * | 11/2008 | Pan et al. .................. 428/98 |
| 2008/0299031 A1 | 12/2008 | Liu et al. |
| 2009/0009634 A1 | 1/2009 | Nakayamai |
| 2009/0016951 A1 | 1/2009 | Kawabata et al. |
| 2009/0057296 A1 | 3/2009 | Niemz et al. |
| 2009/0085461 A1 | 4/2009 | Feng et al. |
| 2009/0096346 A1 | 4/2009 | Liu et al. |
| 2009/0096348 A1 | 4/2009 | Liu et al. |
| 2009/0127743 A1 | 5/2009 | Chan et al. |
| 2009/0156293 A1 | 6/2009 | Inamura |
| 2009/0160799 A1 * | 6/2009 | Jiang et al. .................. 345/173 |
| 2009/0212040 A1 | 8/2009 | O'Connor |
| 2010/0000989 A1 | 1/2010 | Feng et al. |
| 2010/0126985 A1 | 5/2010 | Feng et al. |
| 2010/0140257 A1 | 6/2010 | Feng et al. |
| 2010/0203316 A1 | 8/2010 | Hata et al. |
| 2010/0244307 A1 | 9/2010 | Lemaire et al. |

FOREIGN PATENT DOCUMENTS

| | | |
|---|---|---|
| CN | 2455033 | 10/2001 |
| CN | 2494094 | 5/2002 |
| CN | 1483667 A | 3/2004 |
| CN | 2636571 Y | 8/2004 |
| CN | 1529334 | 9/2004 |
| CN | 2689638 | 3/2005 |
| CN | 1619800 | 5/2005 |
| CN | 1206699 | 6/2005 |
| CN | 2731895 | 10/2005 |
| CN | 2739909 | 11/2005 |
| CN | 1803594 | 7/2006 |
| CN | 1847144 | 10/2006 |
| CN | 1872673 | 12/2006 |
| CN | 1910771 | 2/2007 |
| CN | 1917135 | 2/2007 |
| CN | 1309770 | 4/2007 |
| CN | 1309770 C | 4/2007 |
| CN | 2896773 | 5/2007 |
| CN | 101086939 | 12/2007 |
| CN | 101090586 | 12/2007 |
| CN | 101092234 A | 12/2007 |
| CN | 200994196 Y | 12/2007 |
| CN | 101102838 | 1/2008 |
| CN | 101121497 | 2/2008 |
| CN | 101138896 | 3/2008 |
| CN | 101192490 | 6/2008 |
| CN | 101239712 | 8/2008 |
| CN | 101284662 | 10/2008 |
| CN | 100443404 | 12/2008 |
| CN | 101314464 A | 12/2008 |
| CN | 101400198 | 4/2009 |
| DE | 102004044352 | 3/2006 |
| DE | 202005013822 | 9/2006 |
| DE | 202005014678 | 9/2006 |
| DE | 102005038816 B3 | 1/2007 |
| DE | 102006014171 | 9/2009 |
| EP | 2043406 | 4/2009 |
| JP | S56-91391 | 7/1981 |
| JP | 60-159591 | 8/1985 |
| JP | S60-159591 | 8/1985 |
| JP | 64-60988 | 3/1989 |
| JP | S64-60988 | 3/1989 |

| | | |
|---|---|---|
| JP | 1-289087 | 11/1989 |
| JP | 2-12190 | 1/1990 |
| JP | 5-343170 | 12/1993 |
| JP | 7-85954 | 3/1995 |
| JP | 7-92839 | 4/1995 |
| JP | H07-147183 | 6/1995 |
| JP | H10-319761 | 12/1998 |
| JP | 2000-56605 | 2/2000 |
| JP | 2000-58228 | 2/2000 |
| JP | 2000-77167 | 3/2000 |
| JP | 200077167 | 3/2000 |
| JP | 2002-75604 | 3/2002 |
| JP | 200275602 | 3/2002 |
| JP | 2004-30926 | 1/2004 |
| JP | 2004-186102 | 7/2004 |
| JP | 2004189155 | 7/2004 |
| JP | 2004-528677 | 9/2004 |
| JP | 2005-8446 | 1/2005 |
| JP | 2005-55317 | 3/2005 |
| JP | 2005-102924 | 4/2005 |
| JP | 2005100757 | 4/2005 |
| JP | 2005-255985 | 9/2005 |
| JP | 2006-228745 | 8/2006 |
| JP | 2006-261131 | 9/2006 |
| JP | 2006-294604 | 10/2006 |
| JP | WO2007015710 | 2/2007 |
| JP | 2007-109640 | 4/2007 |
| JP | 2007-161563 | 6/2007 |
| JP | 2007-263193 | 10/2007 |
| JP | 2007-272223 | 10/2007 |
| JP | 2008-164115 | 7/2008 |
| JP | 2008-168631 | 7/2008 |
| JP | 2008-523254 | 7/2008 |
| JP | 2009-91239 | 4/2009 |
| JP | 2009-91240 | 4/2009 |
| JP | 2009-94074 | 4/2009 |
| JP | 2009-142633 | 7/2009 |
| JP | 2009-173469 | 8/2009 |
| JP | 2010-3693 | 1/2010 |
| JP | 2010-18515 | 1/2010 |
| KR | 20040010558 | 1/2004 |
| KR | 20050007886 | 1/2005 |
| KR | 20070079862 | 8/2007 |
| KR | 100797094 | 1/2008 |
| TW | 200407259 | 5/2004 |
| TW | 200715334 | 4/2007 |
| TW | 200724486 | 7/2007 |
| TW | 200732250 | 9/2007 |
| TW | 200738553 | 10/2007 |
| TW | 200800793 | 1/2008 |
| TW | 200824903 | 6/2008 |
| TW | 1346711 | 8/2011 |
| TW | I346711 | 8/2011 |
| WO | WO9925154 | 5/1999 |
| WO | WO02/17687 | 2/2002 |
| WO | WO0238496 | 5/2002 |
| WO | WO02059936 | 8/2002 |
| WO | 2004/023845 | 3/2004 |
| WO | 2004/082333 | 9/2004 |
| WO | WO2005069412 | 7/2005 |
| WO | WO2006/030981 | 3/2006 |
| WO | 2006064242 A1 | 6/2006 |
| WO | WO2006065431 | 6/2006 |
| WO | 2006/122736 | 11/2006 |
| WO | 2007/089118 | 8/2007 |
| WO | WO2007/015710 | 8/2007 |
| WO | WO2007089118 | 8/2007 |
| WO | WO2007/111107 | 10/2007 |
| WO | WO2008133299 | 11/2008 |

OTHER PUBLICATIONS

Yeo-Hwan Yoon, et al. Transparent Film Heater Using Single-Walled Carbon Nanotubes. Advanced Materials, Nov. 29, 2007, 4284-4287, 19, Wiley InterScience, Germany.

Petra potschke, Arup R. Bhattacharyya, Andreas Janke: "Carbon nanotube-filled polycarbonate composites produced by melt mixing and their use in blends with polyethylene", CARBON, vol. 42, No. 5-6, pp. 965-969(Jan. 25, 2004).

Wei Jinquan et al: "Carbon nanotube filaments in household light bulbs", Applied Physics Letters, vol. 84, No. 24, pp. 4869-4871 (Jun. 14, 2004).

Jiang KaiLi, Li QunQing, Fan Shou Shan. "Continuous carbon nanobute yarns and their applications". Phys., vol. 32(8), pp. 506-510(Aug. 31, 2003).

Akita et al. "Nano-Processing Tool using a Carbon Nanotube Nano-heater", IEEE Micro Processes and Nanotechnology Conference, 2004, p. 320-321.

Jiang Kai-Li et al. "Continuous carbon nanotube yarns and their applications" Physics, vol. 32, No. 8, p. 506-510. Abstract and Figure 3 may be relevant, Aug. 2003.

* cited by examiner

SHEET-SHAPED HEAT AND LIGHT SOURCE

This application is related to commonly-assigned applications entitled, "SHEET-SHAPED HEAT AND LIGHT SOURCE, METHOD FOR MAKING THE SAME", filed on Dec. 29, 2007, application Ser. No. 12/006,302; and "SHEET-SHAPED HEAT AND LIGHT SOURCE, METHOD FOR MAKING THE SAME", filed on Dec. 29, 2007, application Ser. No. 12/006,314. Disclosures of the above-identified applications are incorporated herein by reference.

BACKGROUND

1. Field of the Invention

The invention generally relates to sheet-shaped heat and light sources, methods for making the same and methods for heating objects adopting the same and, particularly, to a carbon nanotube based sheet-shaped heat and light source, a method for making the same and a method for heating objects adopting the same.

2. Discussion of Related Art

Carbon nanotubes (CNT) are a novel carbonaceous material and have received a great deal of interest since the early 1990s. It was reported in an article by Sumio Iijima, entitled "Helical Microtubules of Graphitic Carbon" (Nature, Vol. 354, Nov. 7, 1991, pp. 56-58). CNTs are conductors, chemically stable, and capable of having a very small diameter (much less than 100 nanometers) and large aspect ratios (length/diameter). Due to these and other properties, it has been suggested that CNTs should play an important role in various fields, such as field emission devices, new optic materials, sensors, soft ferromagnetic materials, etc. Moreover, due to CNTs having excellent electrical conductivity, thermal stability, and light emitting property similar to black/blackbody radiation, carbon nanotubes can also, advantageously, be used in the field of heat and light sources.

A carbon nanotube yarn drawn from an array of carbon nanotubes and affixed with two electrodes, emits light, when a voltage is applied across the electrodes. The electrical resistance of the carbon nanotube yarn does not increase as much, as metallic light filaments, with increasing temperature. Accordingly, power consumption, of the carbon nanotube yarn, is low at incandescent operating temperatures. However, carbon nanotube yarn is a linear heat and light source, and therefore, difficult to use in a sheet-shaped heat and light source.

Non-linear sheet-shaped heat and light source, generally, includes a quartz glass shell, two or more tungsten filaments or at least one tungsten sheet, a supporting ring, sealing parts, and a base. Two ends of each tungsten filament are connected to the supporting ring. In order to form a planar light emitting surface, the at least two tungsten filaments are disposed parallel to each other. The supporting ring is connected to the sealing parts. The supporting ring and the sealing parts are disposed on the base, thereby, defining a closed space. An inert gas is allowed into the closed space to prevent oxidation of the tungsten filaments. However, they are problems with the sheet-shaped heat and light source: Firstly, because tungsten filaments/sheets are grey-body radiation emitters, the temperature of tungsten filaments/sheets increases slowly, thus, they have a low efficiency of heat radiation. As such, distance of heat radiation transmission is relatively small. Secondly, heat radiation and light radiation are not uniform. Thirdly, tungsten filaments/sheets are difficult to process. Further, during light emission, the tungsten filaments/sheets maybe need a protective work environment.

What is needed, therefore, is a sheet-shaped heat and light source having a large area, uniform heat and light radiation, a method for making the same being simple and easy to be applied, and a method for heating an object adopting the same.

SUMMARY

A sheet-shaped heat and light source includes a first electrode, a second electrode, and a carbon nanotube film. The first electrode and the second electrode are separately disposed on the carbon nanotube film at a certain distance and electrically connected thereto. The carbon nanotube film includes a plurality of carbon nanotubes, which are selected from the group consisting of the carbon nanotubes isotropically arranged, arranged along a fixed direction, or arranged along different directions.

Other advantages and novel features of the present sheet-shaped heat and light source, the method for making the same, and a method for heating object adopting the same will become more apparent from the following detailed description of present embodiments when taken in conjunction with the accompanying drawings.

BRIEF DESCRIPTION OF THE DRAWINGS

Many aspects of the present sheet-shaped heat and light source, the method for making the same, and a method for heating object adopting the same can be better understood with reference to the following drawings. The components in the drawings are not necessarily to scale, the emphasis instead being placed upon clearly illustrating the principles of the present sheet-shaped heat and light source, the method for making the same, and a method for heating an object adopting the same.

Figure 1:
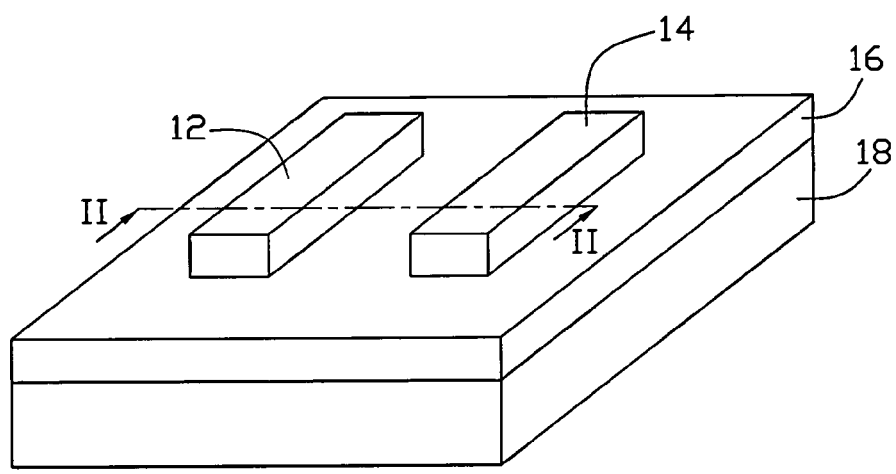
FIG. 1 is a schematic view of a sheet-shaped heat and light source, in accordance with the present embodiment.

Corresponding reference characters indicate corresponding parts throughout the several views. The exemplifications set out herein illustrate at least one present embodiment of the sheet-shaped heat and light source, the method for making the same, and a method for heating object adopting the same, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the sheet-shaped heat and light source, the method for making the same, and a method for heating an object adopting the same.

Figure 2:
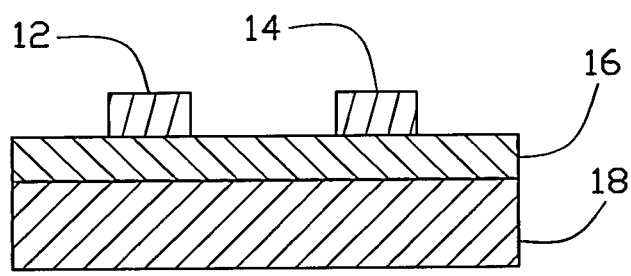
FIG. 2 is a cross-sectional schematic view of FIG. 1 along a line II-II'.

Referring to FIGS. 1 and 2, a sheet-shaped heat and light source 10 is provided in the present embodiment. The sheet-shaped heat and light source 10 includes a first electrode 12, a second electrode 14, a carbon nanotube film 16, and a base 18. The first electrode 12 and the second electrode 14 are separately disposed on the carbon nanotube film 16 at a certain distance apart and electrically connected thereto.

Further, the carbon nanotube film 16 includes a plurality of carbon nanotubes parallel arranged and orientated therein, thereby the carbon nanotubes of the carbon nanotube film 16 having a fixed orientation, that is, parallel to a surface of the carbon nanotube film 16. The carbon nanotubes are selected from the group consisting of the carbon nanotubes isotropically arranged along a fixed direction, or arranged along different directions. The adjacent carbon nanotubes are combined and attracted by van der Waals attractive force, thereby forming a free-standing structure. As such, the carbon nanotube film 16 has good tensile strength, and can, advantageously, be formed into most any desired shape, and so, opportunely, can have a planar or curved structure.

Length and width of the carbon nanotube film 16 is not limited. It can be made with any desired length or width according to practical needs. In the present embodiment, a thickness of the carbon nanotube film 16 is in an approximate range from 1 micrometer to 1 millimeter. In the present embodiment, the carbon nanotube film 16 is planar. The carbon nanotubes in the carbon nanotube film 16 are arranged along different directions. A length of each carbon nanotube film is about 30 centimeters. A width of each carbon nanotube film is about 30 centimeters. A thickness of each carbon nanotube film is about 50 micrometers.

It is to be understood that the carbon nanotube film 16 can, advantageously, be replaced by a carbon nanotube layer. The carbon nanotube layer can, opportunely, include many layers of carbon nanotube films overlapping each other to form an integrated carbon nanotube layer with an angle of $\alpha$, and $\alpha$ is the angle of difference between the two orientations of carbon nanotubes of the two adjacent and overlapped carbon nanotube films, $0 \leq \alpha \leq 90°$. The specific degree of $\alpha$ depends on practical needs. That is, the nanotubes of one carbon nanotube film are oriented in a same direction and the nanotubes in an adjacent and overlapped carbon nanotube film are all oriented in a direction 0-90 degrees different from the first film. The first electrode 12 and the second electrode 14 are separately disposed on the carbon nanotube layer at a certain distance, and electrically connected to the carbon nanotube layer.

Moreover, the first electrode 12 and the second electrode 14 can, opportunely, be disposed on a same surface or opposite surfaces of the carbon nanotube film 16. Further, the first electrode 12 and the second electrode 14 are separated at a certain distance to form a certain resistance therebetween, thereby preventing short circuits in use.

In the present embodiment, because of the adhesive properties of carbon nanotube film, the first electrode 12 and the second electrode 14 are directly attached to the carbon nanotube film 16, and thereby forming an electrical contact therebetween. Moreover, the first electrode 12 and the second electrode 14 are attached on the same surface of the carbon nanotube film 16 by a conductive adhesive. Quite suitably, the conductive adhesive material is silver adhesive. It should be noted that any other bonding ways can be adopted as long as the first electrode 12 and the second electrode 14 are electrically connected to the carbon nanotube film 16.

The base 18 is selected from the group consisting of ceramic, glass, resin, and quartz. The base 18 is used to support the carbon nanotube film 16. The shape of the base 18 can be determined according to practical needs. In the present embodiment, the base 18 is a ceramic substrate. Due to the carbon nanotube film 16 having a free-standing property, in practice, the sheet-shaped heat and light source 10 can, benefically, be without the base 18.

Figure 3:
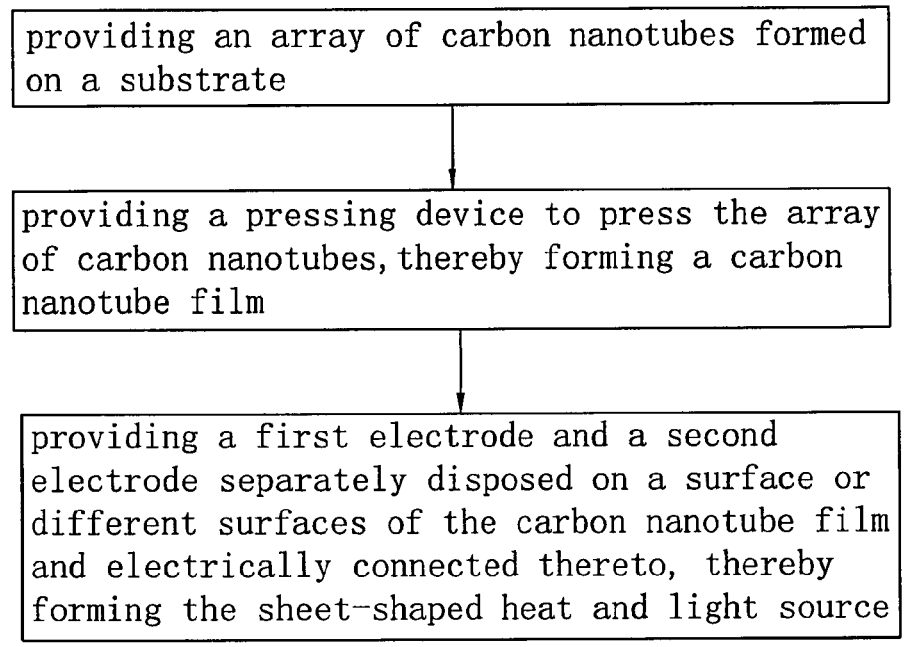
FIG. 3 is a flow chart of a method for making the sheet-shaped heat and light source shown in FIG. 1.

Referring to FIG. 3, a method for making the above-described sheet-shaped heat and light source 10 are provided in the present embodiment. The method includes the steps of: (a) providing an array of carbon nanotubes formed on a substrate; (b) providing a pressing device to press the array of carbon nanotubes, thereby forming a carbon nanotube film 16; and (c) providing a first electrode and a second electrode separately disposed on a same surface or opposite surfaces of the carbon nanotube film and electrically connected thereto, thereby forming the sheet-shaped heat and light source 10.

In step (a), an array of carbon nanotubes, quite suitably, a super-aligned array of carbon nanotubes is provided. The given super-aligned array of carbon nanotubes can be formed by the steps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing a super-aligned array of carbon nanotubes on the substrate.

In step (a1), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height above 100 micrometers and include a plurality of carbon nanotubes parallel to each other and approximately perpendicular to the substrate. Because the length of the carbon nanotubes is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), a certain pressure can, beneficially, be applied to the array of carbon nanotubes by the pressing device. In the process of pressing, the carbon nanotubes in the array of carbon nanotubes form the carbon nanotube film 16 under pressure. Quite suitably, the carbon nanotubes are nearly all parallel to a surface of the carbon nanotube film 16.

Figure 4:
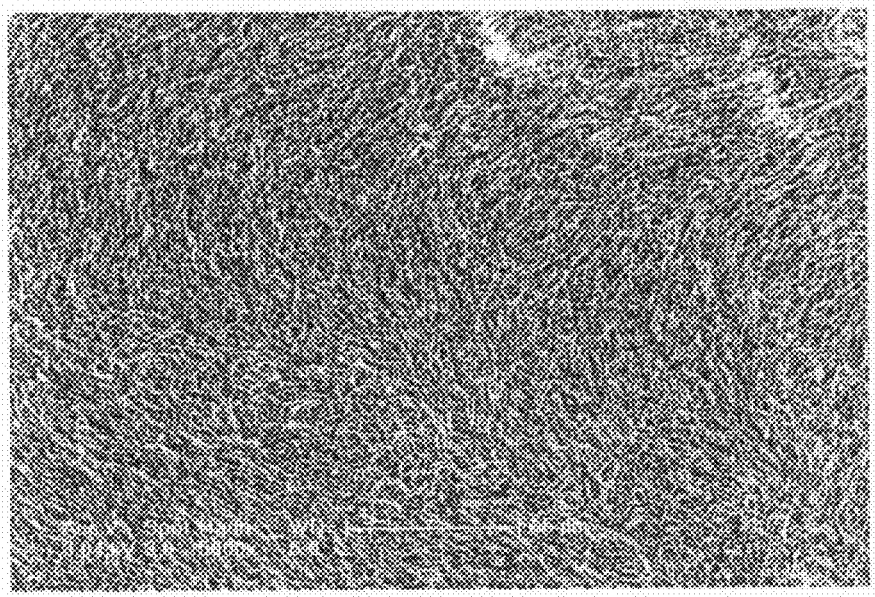
FIG. 4 shows a Scanning Electron Microscope (SEM) image of a carbon nanotube film including isotropic carbon nanotubes formed by the method of FIG. 3.
Figure 5:
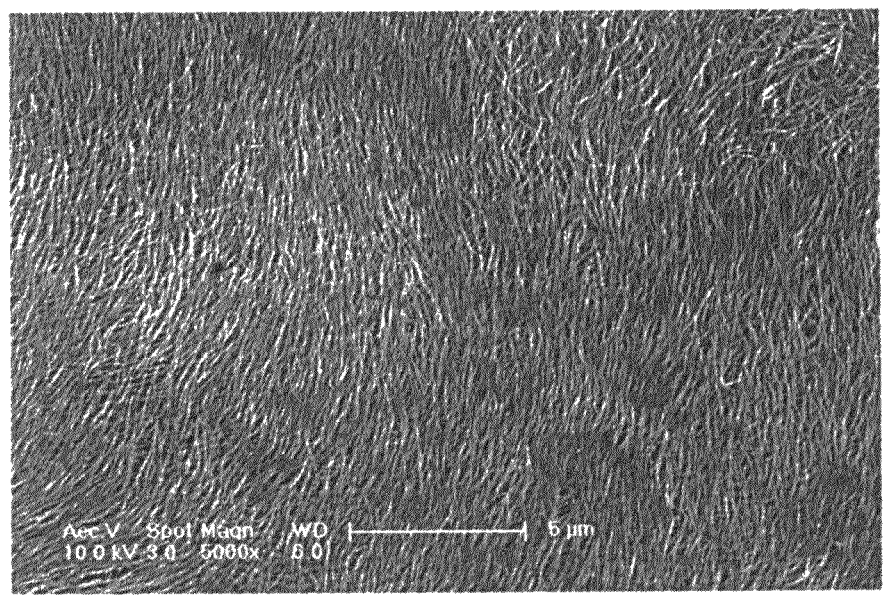
FIG. 5 shows a Scanning Electron Microscope (SEM) image of a carbon nanotube film formed by the method of FIG. 3 wherein the carbon nanotube film has a preferred orientation.

In the present embodiment, the pressing device can, advantageously, be a pressure head. The pressure head has a glossy surface. It is to be understood that, the shape of the pressure head and the pressing direction can, opportunely, determine the direction of the carbon nanotubes arranged therein. Specifically, referring to FIG. 4, when a planar pressure head is used to press the array of carbon nanotubes along the direction perpendicular to the substrate, a carbon nanotube film having a plurality of carbon nanotubes isotropically arranged can, advantageously, be obtained. Referring to FIG. 5, when a roller-shaped pressure head is used to press the array of carbon nanotubes along a fixed direction, a carbon nanotube film having a plurality of carbon nanotubes aligned along the fixed direction is obtained. When a roller-shaped pressure head is used to press the array of carbon nanotubes along different directions, a carbon nanotube film having a plurality of carbon nanotubes aligned along different directions is obtained.

Understandably, in the process of pressing, the carbon nanotubes will, beneficially, tilt, thereby forming a carbon nanotube film having a free-standing structure. The carbon nanotubes in the free-standing structure are nearly all parallel to a surface of the carbon nanotube film, and are isotropically arranged, arranged along a fixed direction, or arranged along different directions.

It is to be understood that, a degree of the slant of the carbon nanotubes in the carbon nanotube film 16 is related to the pressure. The greater the pressure, the greater the degree of slant. A thickness of the carbon nanotube film 16 is opportunely determined by the height of the carbon nanotube array and the pressure. That is, the greater the height of the carbon nanotube array and the less the pressure, the larger the thickness of the carbon nanotube film 16.

Quite usefully, the carbon nanotube film 16 can be treated with an organic solvent. The organic solvent is volatilizable and can be selected from the group consisting of ethanol, methanol, acetone, dichloroethane, and chloroform. Quite suitably, the organic solvent is dropped on the carbon nanotube film 16 through a dropping tube in the present embodiment. After soaking, in the organic solvent, the carbon nanotube segments in the carbon nanotube film 16 will, at least, partially be formed into carbon nanotube bundles due to the surface tension of the organic solvent. Due to the decrease of the surface area, the carbon nanotube film 16 loses viscosity but maintains high mechanical strength and toughness.

Further, the carbon nanotube film 16 can be overlapped on another array of carbon nanotubes, by repeating the step (b), thereby forming a carbon nanotube layer containing two carbon nanotube films. The two carbon nanotube films in the carbon nanotube layer are overlapped and coupled by van der Waals attractive force. As such, the carbon nanotube layer including several carbon nanotube films can, opportunely, be obtained.

It is to be noted that, the carbon nanotube films can, beneficially, be overlapped to form a carbon nanotube layer. Quite suitably, the pressing device can, opportunely, be used to press the carbon nanotube films, thereby forming the carbon nanotube layer.

In practical use, the carbon nanotube film 16 can, beneficially, be disposed on a base 18. The base 18 is selected from the group consisting of ceramic, glass, resin, and quartz. The base 18 is used to support the carbon nanotube film 16. The shape of the base 18 can be determined according to practical needs. In the present embodiment, the base 18 is a ceramic substrate. Moreover, due to the carbon nanotube film 16 having a free-standing property, in practice, the carbon nanotube film 16 can, opportunely, be used in the sheet-shaped heat and light source 10 without the base 18.

In a process of using the sheet-shaped heat and light source 10, when a voltage is applied to the first electrode 12 and the second electrode 14, the carbon nanotube film 16 of the sheet-shaped heat and light source 10 emits electromagnetic waves with a certain wavelength. Quite suitably, when the carbon nanotube film 16 of the sheet-shaped heat and light source 10 has a fixed surface area (length*width), the voltage and the thickness of the carbon nanotube film 16 can, opportunely, be used to make the carbon nanotube film 16 emit electromagnetic waves at different wavelengths. If the voltage is fixed at a certain value, the electromagnetic waves emitting from the carbon nanotube film 16 are inversely proportional to the thickness of the carbon nanotube film 16. That is, the greater the thickness of carbon nanotube film 16, the shorter the wavelength of the electromagnetic waves. Further, if the thickness of the carbon nanotube film 16 is fixed at a certain value, the greater the voltage applied to the electrode, the shorter the wavelength of the electromagnetic waves. As such, the sheet-shaped heat and light source 10, can be easily configured to emit a visible light and create general thermal radiation or emit infrared radiation.

Due to carbon nanotubes having an ideal black body structure, the carbon nanotube film 16 has excellent electrical conductivity, thermal stability, and high thermal radiation efficiency. The sheet-shaped heat and light source 10 can, advantageously, be safely exposed, while in use, to oxidizing gases in a typical environment. When a voltage of 10 volts~30 volts is applied to the electrodes, the sheet-shaped heat and light source 10 emits electromagnetic waves. At the same time, the temperature of sheet-shaped heat and light source 10 is in the approximate range from 50° C. to 500° C.

In the present embodiment, the surface area of the carbon nanotube film 16 is 900 square centimeters. Specifically, both the length and the width of the carbon nanotube film 16 are 30 centimeters. The carbon nanotube film 16 includes a plurality of carbon nanotubes, which are selected from the group consisting of the carbon nanotubes isotropically arranged along a fixed direction, or arranged along different directions.

Further, quite suitably, the sheet-shaped heat and light source 10 is disposed in a vacuum device or a device with inert gas filled therein. When the voltage is increased in the approximate range from 80 volts to 150 volts, the sheet-shaped heat and light source 10 emits electromagnetic waves such as visible light (i.e. red light, yellow light etc), general thermal radiation, and ultraviolet radiation.

It is to be noted that the sheet-shaped heat and light source 10 can, beneficially, be used as electric heaters, infrared therapy devices, electric radiators, and other related devices. Moreover, the sheet-shaped heat and light source 10 can, beneficially, be used as an optical device, and thereby being used as light sources, displays, and other related devices.

Figure 6:
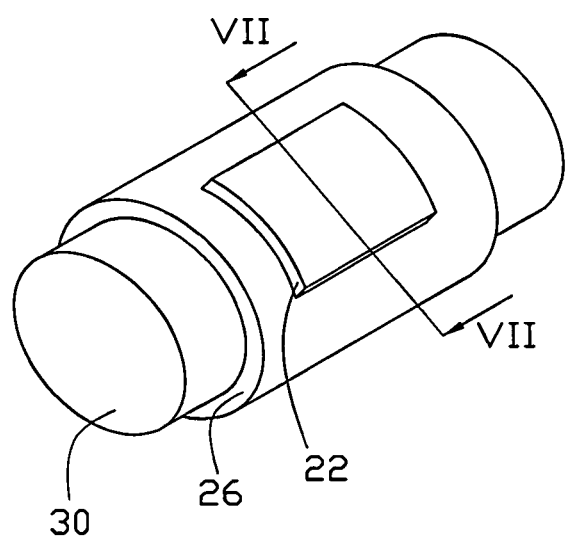
FIG. 6 is a schematic view of heating an object using the sheet-shaped heat and light source shown in FIG. 1.
Figure 7:
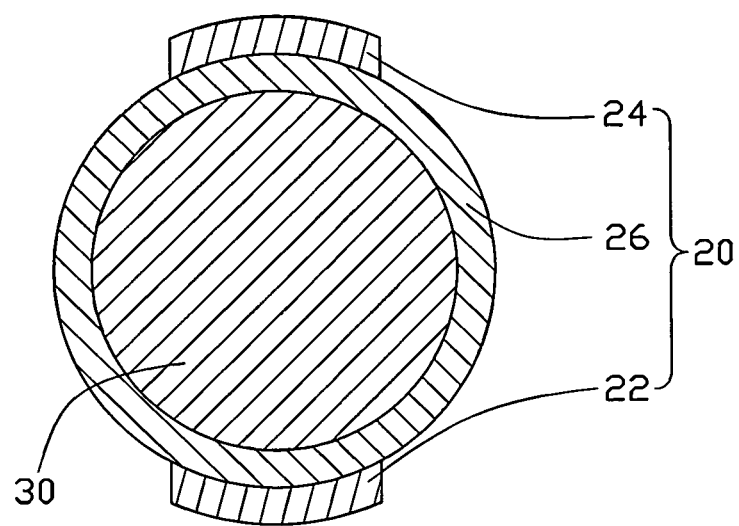
FIG. 7 is a cross-sectional schematic view of FIG. 6 along a line VII-VII'.

Referring to FIGS. 6 and 7, a method for heating an object adopting the above-described sheet-shaped heat and light source 20 is also described. In the present embodiment, the sheet-shaped heat and light source 20 includes a first electrode 22, a second electrode 24, and a carbon nanotube film 26, curved to form a hollow cylinder. Further, the first electrode 24 and the second electrode 26 are separately disposed on the carbon nanotube film 26 at a certain distance apart and electrically connected thereto.

Further, the surface area of the carbon nanotube film 26 is 900 square centimeters. Specifically, both the length and the width of the carbon nanotube film 26 are 30 centimeters. The carbon nanotube film 26 includes a plurality of carbon nanotubes, which are selected from the group consisting of the carbon nanotubes isotropically arranged, arranged along a fixed direction, or arranged along different directions. The voltage applied to the electrode 12 and the electrode 14 is 15 volts. The temperature of the sheet-shaped heat and light source 10 is about 300° C.

Due to the carbon nanotube film 26 having a free-standing property, the sheet-shaped heat and light source 20 is without a base. Because the carbon nanotube film 26 has excellent tensile strength, the sheet-shaped heat and light source 10 has advantageously a ring-shaped or a hollow cylinder-shaped carbon nanotube film 26. Quite suitably, in the process of heating the object 30, the object 30 and the carbon nanotube film 26 are directly contacted with each other or apart from each other at a certain distance as required.

The method for heating an object using the sheet-shaped heat and light sources 20 includes the steps of: providing an object 30; disposing a carbon nanotubes layer 26 of the sheet-shaped heat and light source 20 to a surface of the object 30; and applying a voltage between the first electrode 22 and the second electrode 24 to heat the object 30.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A heat and light source comprising:
    a carbon nanotube film curved to form a hollow cylinder, wherein the carbon nanotube film comprises a plurality of carbon nanotubes substantially arranged isotropically, along a fixed direction, or along different directions and configured to emit electromagnetic waves; and
    at least two electrodes spaced from each other, disposed on a surface of the hollow cylinder and electrically connected to the carbon nanotube film.

2. The heat and light source of claim 1, wherein a thickness of the carbon nanotube film is in a range from about 1 micrometer to about 1 millimeter, and a length of each of the plurality of carbon nanotubes is above 100 micrometers.

3. The heat and light source of claim 1, wherein the plurality of carbon nanotubes are combined and coupled by van der Waals attractive force, and the carbon nanotube film is a free-standing structure.

4. The heat and light source of claim 1, wherein the plurality of carbon nanotubes are substantially parallel to a surface of the carbon nanotube film.

5. The heat and light source of claim 1, wherein the carbon nanotube film is square shaped.

6. The heat and light source of claim 5, wherein the carbon nanotube film has a length and a width of about 30 centimeters.

7. The heat and light source of claim 6, wherein a height of the hollow cylinder is about 30 centimeters.

8. The heat and light source of claim 1, wherein the at least two electrodes extend along a length direction of the hollow cylinder.

9. The heat and light source of claim 1, wherein the at least two electrodes comprises at least one of metal films and metal foils.

10. The heat and light source of claim 1, wherein the at least two electrodes are disposed on an outer surface of the hollow cylinder.

11. The heat and light source of claim 1, wherein the at least two electrodes are attached on the carbon nanotube film by a conductive adhesive.

12. The heat and light source of claim 1, further comprising a device, wherein the carbon nanotube film is disposed in the device, and the device is a vacuum chamber or a chamber filled with inert gases.

13. A heat and light source comprising:
    a plurality of carbon nanotube films stacked with each other and curved to form a hollow cylinder, wherein each of the plurality of carbon nanotube films comprises a plurality of carbon nanotubes substantially arranged along a fixed direction and configured to emit electromagnetic waves; and
    at least two electrodes spaced from each other, located on a surface of the hollow cylinder and electrically connected to the plurality of carbon nanotube films.

14. The heat and light source of claim 13, wherein an angle between fixed directions of the carbon nanotubes of adjacent carbon nanotube films is in a range from about 0 degrees to about 90 degrees.

15. The heat and light source of claim 13, wherein each of the plurality of carbon nanotube films is square shaped.

16. The heat and light source of claim 15, wherein each of the plurality of carbon nanotube films has a length and a width of about 30 centimeters.

17. The heat and light source of claim 16, wherein a height of the hollow cylinder is about 30 centimeters.

18. The heat and light source of claim 13, wherein the at least two electrodes are located on an outer surface of the hollow cylinder.

19. The heat and light source of claim 13, wherein the at least two electrodes extend along a length direction of the hollow cylinder.

20. A heat and light source comprising:
    a free-standing carbon nanotube film curved to form a hollow cylinder, wherein the carbon nanotube film comprises a plurality of carbon nanotubes; and
    two electrodes located on a surface of the hollow cylinder and electrically connected to the carbon nanotube film, wherein the two electrodes are spaced from, substantially parallel to each other, and extend substantially along a length direction of the hollow cylinder.

* * * * *